United States Patent
Yamauchi et al.

(10) Patent No.: US 7,536,700 B2
(45) Date of Patent: May 19, 2009

(54) DISC DRIVE UNIT

(75) Inventors: Yoshiaki Yamauchi, Minori (JP); Keiji Sasao, Kasumigaura (JP); Ikuo Nishida, Ebina (JP); Hisahiro Miki, Chigasaki (JP); Kouhei Takita, Mitaka (JP)

(73) Assignees: Hitachi, Ltd., Tokyo (JP); Hitachi-LG Data Storage, Inc., Tokyo (JP)

( * ) Notice: Subject to any disclaimer, the term of this patent is extended or adjusted under 35 U.S.C. 154(b) by 355 days.

(21) Appl. No.: 11/043,608

(22) Filed: Jan. 25, 2005

(65) Prior Publication Data
US 2005/0210493 A1    Sep. 22, 2005

(30) Foreign Application Priority Data
Mar. 9, 2004   (JP) ............... 2004-064947

(51) Int. Cl.
*G11B 17/03* (2006.01)
(52) U.S. Cl. .................................... 720/648
(58) Field of Classification Search ............... 720/648, 720/651, 601, 603, 719
See application file for complete search history.

(56) References Cited

U.S. PATENT DOCUMENTS

| | | | | |
|---|---|---|---|---|
| 4,564,930 A | * | 1/1986 | Funabashi et al. | 720/601 |
| 4,773,057 A | * | 9/1988 | Otsuka et al. | 720/603 |
| 5,617,396 A | * | 4/1997 | Choi | 720/603 |
| 6,125,099 A | * | 9/2000 | Boutaghou et al. | 720/719 |
| 6,317,402 B1 | * | 11/2001 | Huang et al. | 720/603 |
| 7,076,789 B2 | * | 7/2006 | Yanase et al. | 720/601 |
| 7,086,069 B2 | * | 8/2006 | Choi | 720/603 |

FOREIGN PATENT DOCUMENTS

| | | |
|---|---|---|
| JP | 2001-110175 A | 4/2001 |
| JP | 2001-176260 A | 6/2001 |
| JP | 2003-168282 | 6/2003 |

* cited by examiner

*Primary Examiner*—Tianjie Chen
(74) *Attorney, Agent, or Firm*—Townsend and Townsend and Crew LLP (57) ABSTRACT

A disc drive unit capable of preventing occurrence of errors in a recording system such as a CD or a DVD, using an optical head for recording data on a disc or reproducing data recorded on the disc. A disc tray is adapted to accommodate the disc, and load and unload the disc. A top cover is arranged above the disc. The top cover is formed therein with a concave and convex part for avoiding positioning a node of each of vibration modes (0, n) (where n=2, 3, 4) caused by a critical rotating speed of the disc, at a position right above the optical head.

1 Claim, 9 Drawing Sheets

(0,2) MODE

FIG.4b (0,3) MODE

FIG.4c (0,4) MODE

(0,2) MODE

FIG.7b

(0,3) MODE

FIG.7c (0,4) MODE

DISC DRIVE UNIT

BACKGROUND OF THE INVENTION

The present invention relates to a drive unit for a removable medium type disc such as a CD or a DVD.

JP-A-2003-168282 (Refer to page 2 and FIG. 3) discloses a disc drive unit as a conventional example. This disc drive unit is adapted to aim at reducing deformation of a disc in a deformation mode at its critical speed. It is noted here that the critical speed is the one at which a natural frequency of backward rotating vibration traveling in a direction reverse to a rotating direction of the disc becomes 0 Hz as viewed externally. If the rotating system is viewed externally, the deformation of the disc moderately drifts around this rotating speed. The disc drive unit disclosed in the JP-A-2003-168282 (Refer to page 2 and FIG. 3) has a disc tray formed therein with a groove for feeding an optical head, which has a groove width set to be not less than a predetermined width in order to induce an incommensurate air distribution in the drive unit. With this configuration, a force which causes excitation of deformation is cancelled out so as to avoid increasing the amplitude of vibration.

In order to enhance the performance of recording and reproduction of a disc drive unit in a CD-ROM or DVD apparatus, it is indispensable to drive the disc unit at a high speed including a critical rotating speed. At this critical speed, the rotation of a disc is unstable, and sensitively responds to affection by disturbance so as to cause deformation and vibration. It had been better to drive the disc drive unit at a speed other than the critical rotating speed lin order to avoid occurrence of this problem. However, at present, the speed-up of CD or DVD apparatus has been advanced, The rotating speed is changed in accordance with a position of an optical head over a speed control range which includes the critical speed.

Further, in a disc drive unit capable of writing data on a CD-R, a DVD-R or the like, detrimental affection such as deformation or vibration becomes especially higher during writing operation thereof than during reading operation. In particular, the inventors have found such a fact that should a node of disc deformation be present right above an optical head, the surface of the disc would be largely inclined so as to greatly lower the performance of recording and reproduction.

No sufficient consideration has been made as to lowering of the stiffness of a disc tray part in the disc drive unit disclosed in the JP-A-2003-168282 (page 2 and FIG. 3). That is, should the width of the groove formed in the disc tray part be too large, the stiffness of the disc tray part would be lowered, possibly causing such a risk that the disc tray vibrates due to an air stream induced by rotation of the disc. Further, through observation of a behavior of deformation at the critical speed at an optical head side (the absolute static system, it has been found that the deformation of the disc is steady state, or any position on the disc is always deformed in one and the same direction, like a DC component in a modulated carrier wave. Thus, it is important to consider a deformation mode above the optical head, in comparison with reduction of the amplitude of vibration of a disc. However, this consideration has not yet been made in this drive disc unit.

SUMMARY OF THE INVENTION

The present invention is devised in view of the above-mentioned disadvantages inherent to the above-mentioned conventional technology, and accordingly, an object to the present invention is to provide a disc drive unit which can stably record and reproduce data to and from a disc. Further, another object of the present invention is to provide a disc drive unit which can be surely operated even at a high speed around a critical speed. Further, another object of the present invention is to enhance the reliability of the disc drive unit.

To the end, according to the present invention, there is provided a disc drive unit for recording data onto a disc and reproducing data recorded on the disc with the use of an optical head, comprising a disc tray accommodating a disc, for loading and unloading a disc, and a top cover located above the disc, and a means for avoiding positioning a node of a vibration mode (0, n where n=, 2, 3 or 4) caused by a critical speed of the disc at a position right above the optical head, provided in at least either one of a disc tray and a top cover.

Further, the disc drive unit comprises a spindle motor for rotating the disc, a disc clamper provided in the above-mentioned top cover, for holding a disc in cooperation of the spindle motor. With this configuration, the above-mentioned avoiding means is a concave and convex part formed in the top cover and exposed on the disc side, preferably around the clamper. It is desirable to provide the concave and convex part at at least one of positions respectively having angles $\phi 1$ and $\phi 2$ ($\phi 1$=100 to 135 deg. and $\phi 2$=45 to 80 deg.) which are measured clockwise and counter clockwise around the center of rotation of the spindle motor as a center, from a line connecting between this center of rotation and the center of an objective lens in the optical head.

In the above-mentioned configuration, the avoiding means is formed in the disc tray which is formed therein with a circular recess for accommodating a disc, and it is preferably a sector or a second recess having substantially the one and the same width, formed in the outer peripheral part of the circular recess. Further, the second recess is formed in a range $\Delta\phi$ from a position, as a start point, having an either one of circumferential angles of $\phi 3$ and $\phi 4$ respectively measured clockwise and counterclockwise around the center of rotation of the spindle motor from the line connecting between this center or rotation and the center of the objective lens in the optical head, where $\phi 3$=135 deg.$-\beta$, $\phi 4$=22.5 deg.$-\beta$, $\Delta\phi$=22.5 deg.$+\alpha$, $\alpha$=0 to 5 deg. Alternatively, in the above-mentioned configuration, the second recess is desirably located at a circumferential position which includes a node of each of vibration modes (0, n, where n=2, 3 or 4) at the critical rotating speed of a disc.

To the end, according to another aspect of the present invention, there is provided a disc drive unit comprising a spindle motor for rotating a disc, a disc tray for introducing the disc into the drive unit, an optical head having an objective lens, for reproducing data recorded on the disc, or recording data onto the disc, and a top cover arranged above the disc which has been introduced, wherein (1) a concave and convex part for controlling a deformation mode of the disc, is formed at at least one position in the top cover in a range from 45 to 80 deg. or from 100 to 135 deg. from a line, as a reference, connecting between the center of rotation of the spindle motor and the center of the objective lens, clockwise or counterclockwise around the center of rotation of the spindle motor, (2) a second recess is formed in the outer peripheral part of a recess for accommodating the disc, which is formed in the disc tray, at at least one position in a range from 22.5 to 45 deg., or from 135 to 157.5 deg. from the line, as a reference, connecting between the center of rotation of the spindle motor and the center of the objective lens, clockwise or counterclockwise around the center of rotation of the spindle motor, or (3) a cutout for movably receiving an optical head may be formed in a recess for accommodating a disc, which is formed in the disc tray, the cutout extending to the outer peripheral part of the recess in a depthwise direction while a part which is a side surface part as a rise part of the recess and which corresponds to the cutout may be a wall surface.

With the configuration of the present invention, since the mechanism for controlling deformation of a disc rotated at high speed is provided in the top cover of the disc drive unit, the position of deformation mode of the disc can be controlled. Thus, even under a high speed condition around the critical rotating speed, the recording and reproduction of a disc can be stably carried out. Thus, it is possible to enhance the reliability of the disc drive unit.

BRIEF DESCRIPTION OF THE SEVERAL VIEWS OF THE DRAWING

FIG. 3a is a view for explaining a deformation mode of the disc drive unit shown in FIG. 2a;

FIG. 3b is a view for explaining a deformation mode of the disc drive unit shown in FIG. 2a;

FIG. 9b is a sectional view illustrating the disc drive unit shown in FIG. 9a.

DETAILED DESCRIPTION OF THE INVENTION

Figure 1:
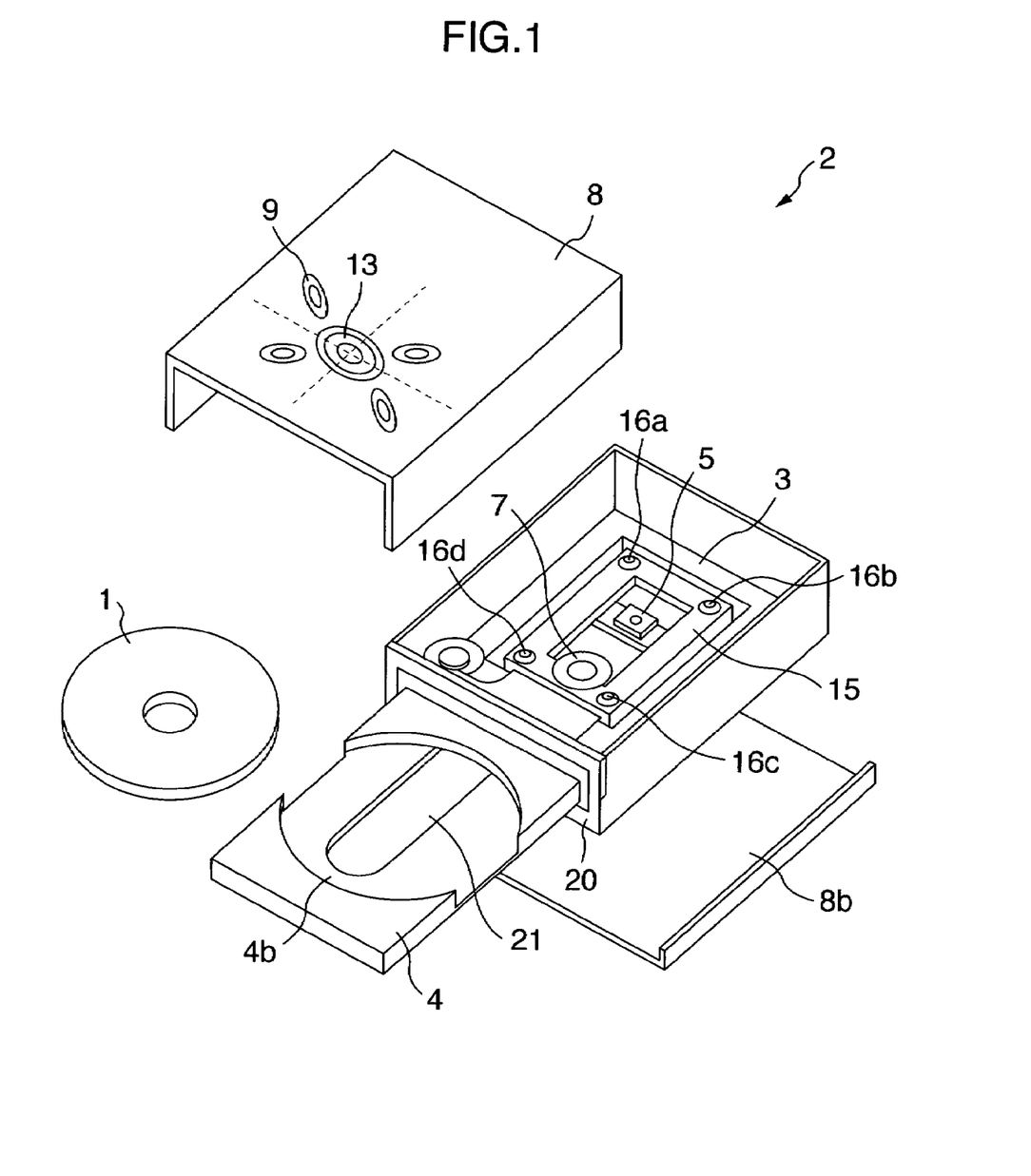
FIG. 1 is an exploded perspective view illustrating a disc drive unit according to the present invention.
Figure 2A:
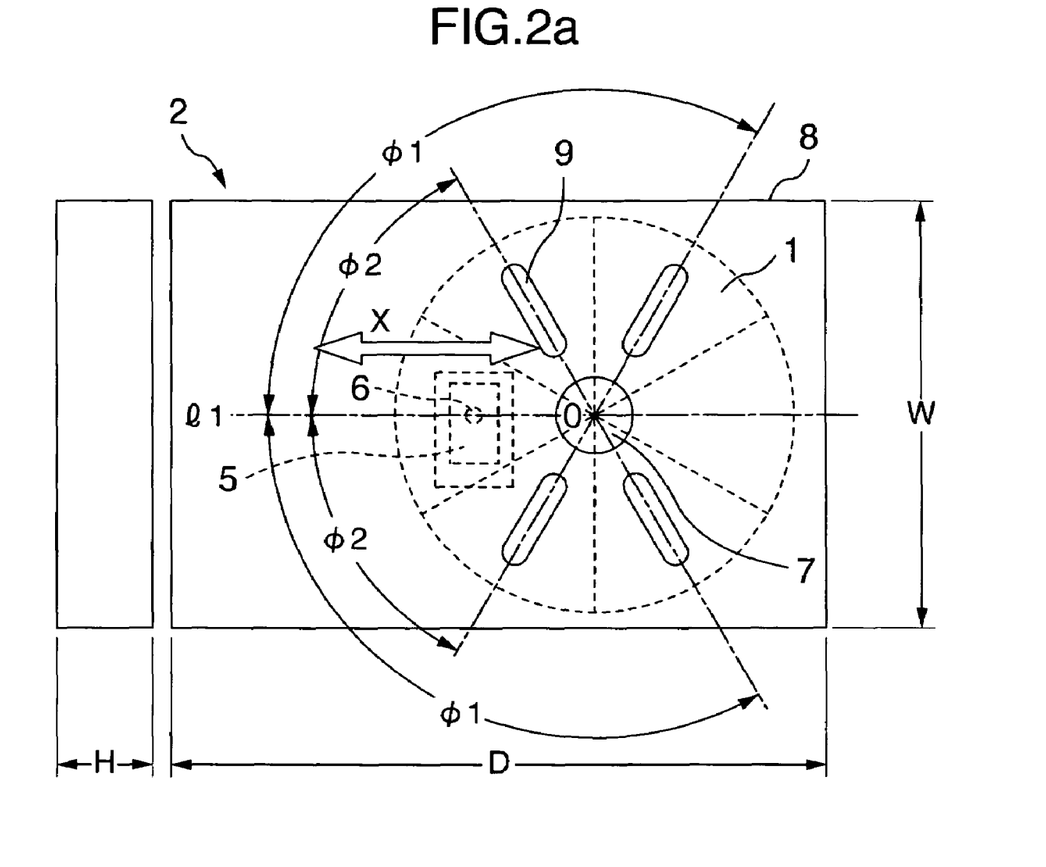
FIG. 2a is a top view illustrating an embodiment of the disc drive unit according to the present invention.
Figure 2B:
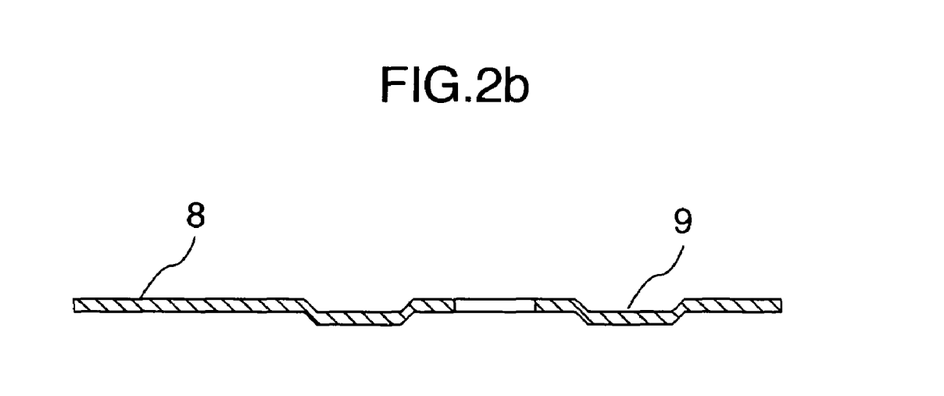
FIG. 2b is a side view illustrating the embodiment of the disc drive unit according to the present invention.
Figure 3A:
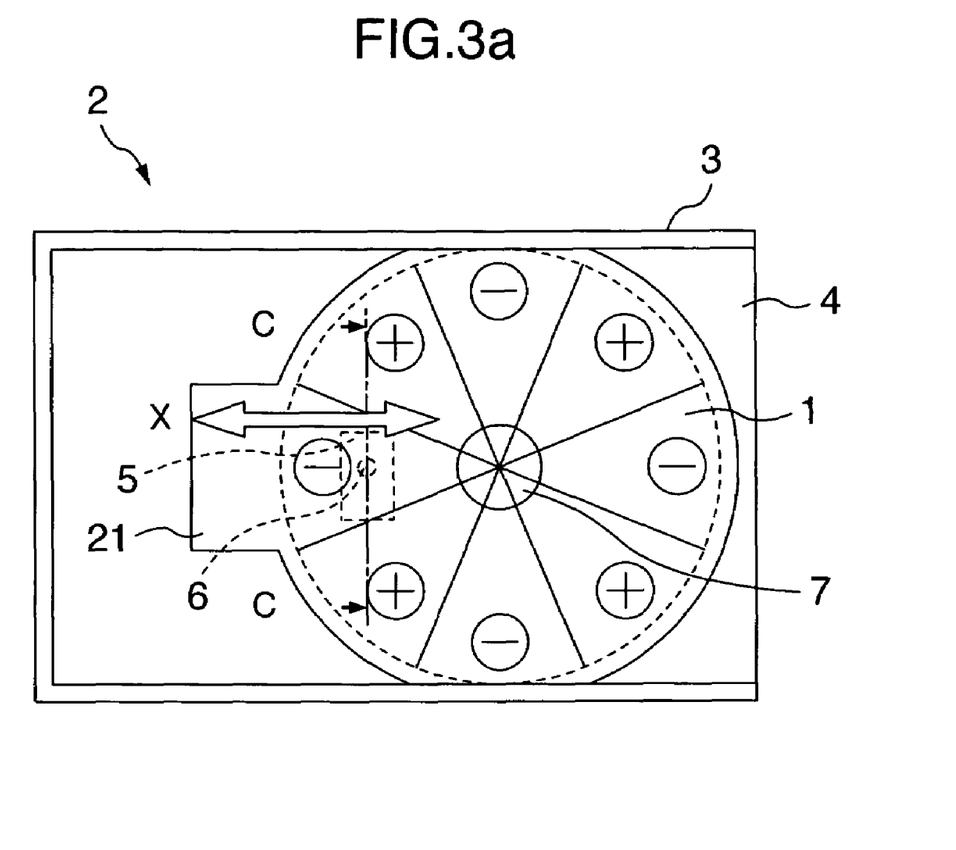
Figure 3B:
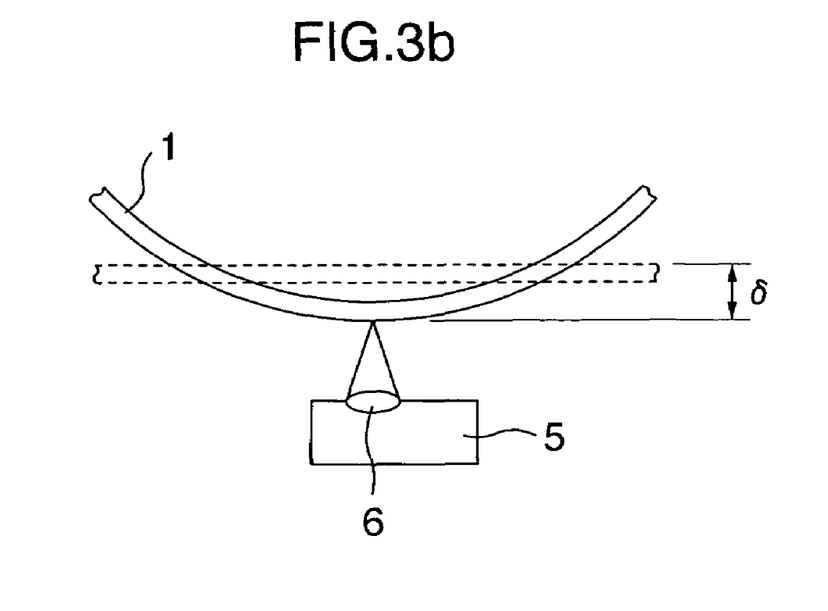
Figure 5A:
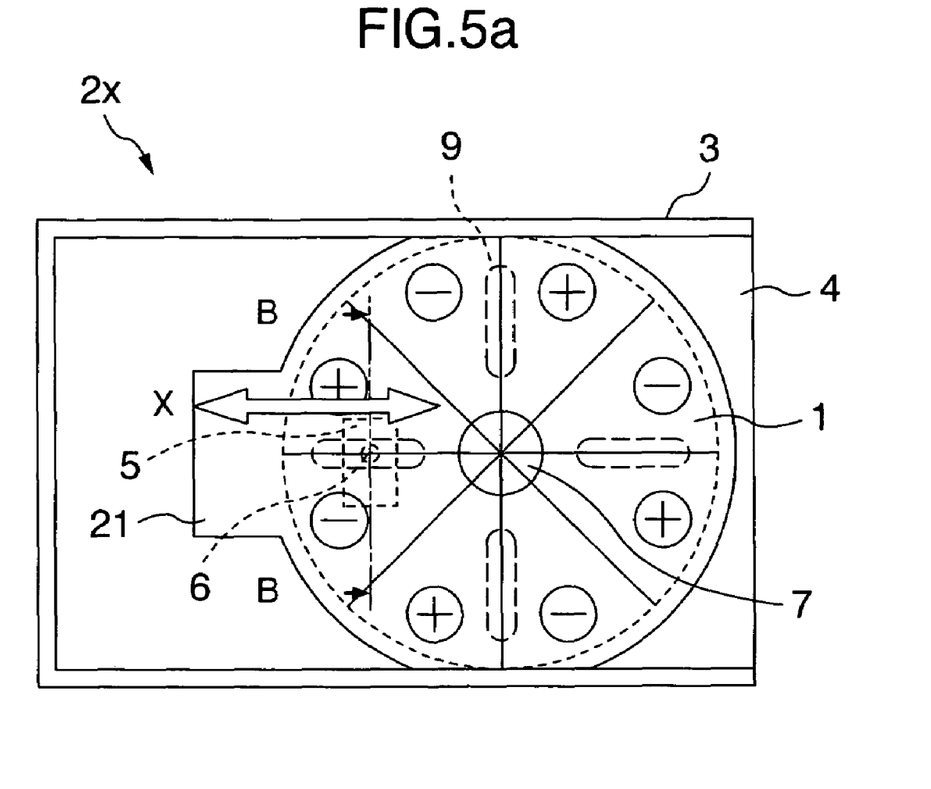
FIG. 5a is a view for explaining a deformation mode of a conventional disc drive unit.
Figure 5B:
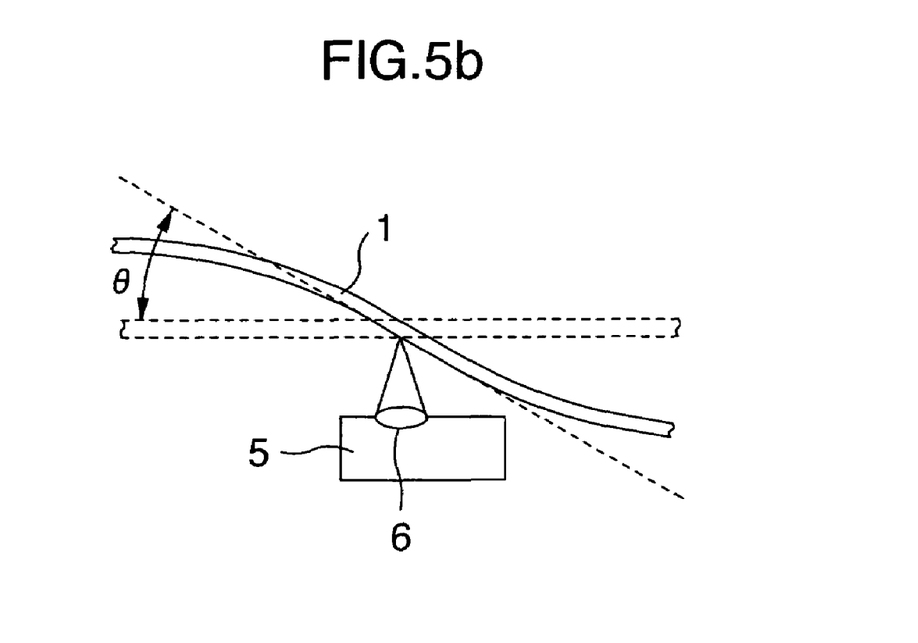
FIG. 5b is a view for explaining a deformation mode of a conventional disc unit.
Figure 6A:
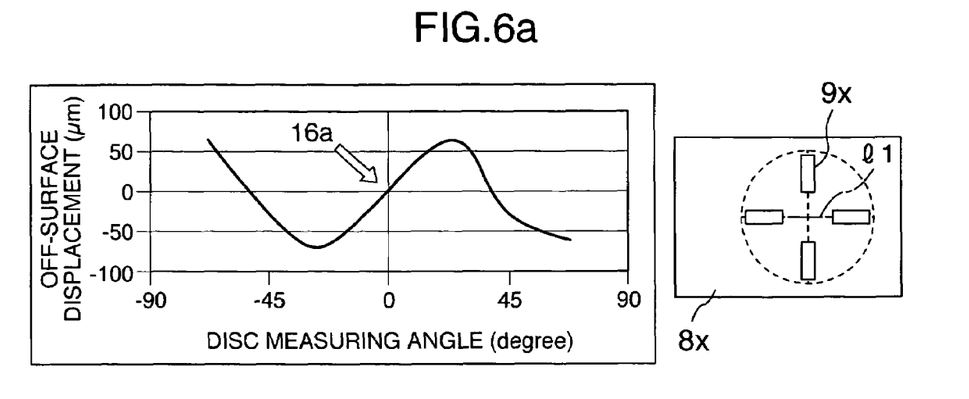
FIG. 6a is a view which shows an example of measurement of a deformation mode of a disc.
Figure 6B:
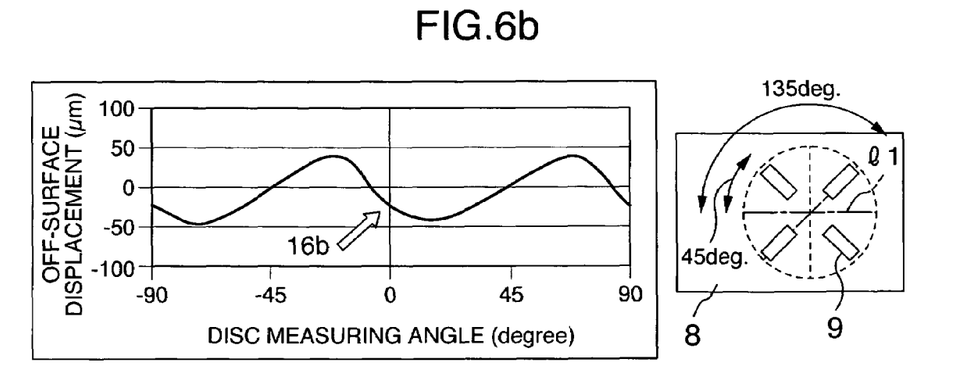
FIG. 6b is a view which shows an example of measurement of a deformation mode of a disc.
Figure 6C:
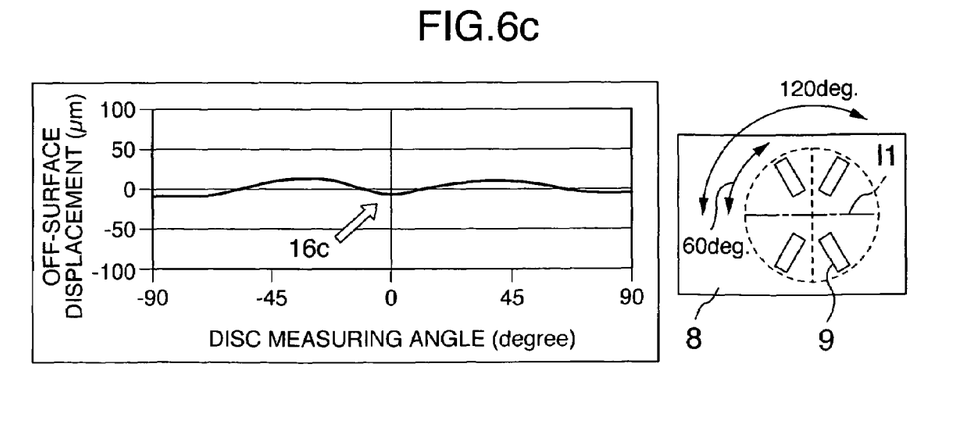
FIG. 6c is a view which shows an example of measurement of a deformation mode of a disc.

Explanation will be hereinbelow made of several embodiments of the present invention with reference to FIGS. 1 to 4c and FIGS. 6a to 9b wherein FIG. 1 is an exploded perspective view which shows a disc drive unit in addition to a disc. FIGS. 2a and 2b are a top view and a side view which show the disc drive unit shown in FIG. 1, FIGS. 3a and 3b are views for explaining a vibration mode of the disc in a condition shown in FIG. 2a, FIG. 4a to 4c are view for explaining vibration modes of a general disc, FIG. 5a to 5b are view for explaining a vibration mode of a conventional disc drive unit, for comparison, FIG. 6a to 6c are views which show examples of measurement of inclination of a disc. It is noted that the explanation will be hereinbelow made of a disc drive unit 2 for a CD or DVD apparatus as an example.

The disc drive unit 2 for a CD or DVD apparatus, incorporated in a personal computer or the like, rotates a medium (which will be hereinbelow referred to as disc) for recording and reproducing data therein or therefrom, having a disc-like shape and having a diameter of 120 mm and a thickness of 1.2 mm. The disc drive unit 2 has a box-like shape, having a width W of about 150 mm, a depth D of 195 mm and a thickness H of 40 mm, and is covered over its upper surface with a top cover 8. After the disc is rotated up to a predetermined speed by means of a spindle motor 7, data on a disc 1 is reproduced or data is recorded on the disc 1 by means of an optical head 5.

As shown in FIG. 1, the disc drive unit 2 incorporates a housing having a disc tray 4 for accommodating the disc 1 and for shifting the disc 1 onto the spindle motor 7, a resin molded mechanical base 3, a bottom cover 8b formed by pressing a metal sheet such as rolled steel, and the top cover 8. The disc tray 4 is formed in its center part with an aperture 21 for allowing the spindle motor and the optical head 5 to access the disc 1. Further, the disc tray 4 is formed therein with a positioning recess 4b for accommodating the disc 1 in a circular shape, having a diameter slightly larger than the diameter of the disc 1.

The housing provided therein with the mechanical base 3 has a front panel 20 formed therein with an introduction entrance through which the disc tray 4 can be moved, on the front surface side thereof. A disc clamper 13 for holding a disc in cooperation with the spindle motor 7 is attached to the upper surface of the top cover 8, corresponding to the position of the spindle motor 7. The top cover 8 is formed in its upper surface with a concave and convex part 9 which will be detailed later, around the disc clamper 13.

The spindle motor 7 is mounted on a unit mechanical chassis 15 which is adapted be moved up and down together with the spindle motor 7 when the disc 1 is fixed to or released from the spindle motor 7. The unit mechanical chassis 15 is formed in a substantially rectangular shape in a plan view, and is attached at its four corners to an unit holder which is not shown, through the intermediary of resilient members 16a to 16d. The unit holder is fitted and coupled to the mechanical base 3. The resilient members 6a to 6d are adapted to dampen vibration and shock transmitted from the outside of the disc drive unit to the unit mechanical chassis 5.

It is noted that a determining means, which is not shown, for determining a kind of the disc 1 introduced into the disc drive unit during actual operation is provided. The determining means discriminates one kind of a medium, among, a CD, a DVD, a ROM/R, a RW/RAM and the like, and determines speed data of the medium.

The optical head 5 is located substantially at a widthwise center, inward from the spindle motor 7 in a depthwise direction. The optical head 5 travels along a line 11 connecting between the center o of rotation of the spindle motor 7 and the center of an objective lens 6 in the optical head 5, in the direction X which is depthwise. It is noted that the optical head 5 and the disc 1 introduced in the disc drive unit 2 are depicted with dotted lines in FIGS. 2a and 2b.

The top cover 8 is formed therein with concave and convex portions 9 at four positions, being spaced from one another, circumferential of the disc. Each of the concave and convex parts 9 has an oval shape, being formed by drawing so as to be projected inward of the disc drive unit 2, substantially having a height of 2 to 4 mm, a width of 10 to 15 mm and a length of 20 to 30 mm. These concave and convex parts 9 restrain vibration of the disc 1 and to reinforces the stiffness of the top cover 8 itself. In this embodiment, the concave and convex parts 9 are formed, axially symmetric with respect a straight line 11, and at angular positions φ1, φ2 measured from this straight line 11. It is noted here that the angle φ1 is set in a range from 100 to 135 deg., while the angle φ2 is set in a range from 45 to 80 deg. Thus, the concave and convex parts 9 formed in the upper surface of the top cover 8 are shifted from the straight line 11 of the disc 1 by a predetermined value so as to locate the concave and convex parts 9 outside of the upper surface of the optical head 5.

Figure 4A:
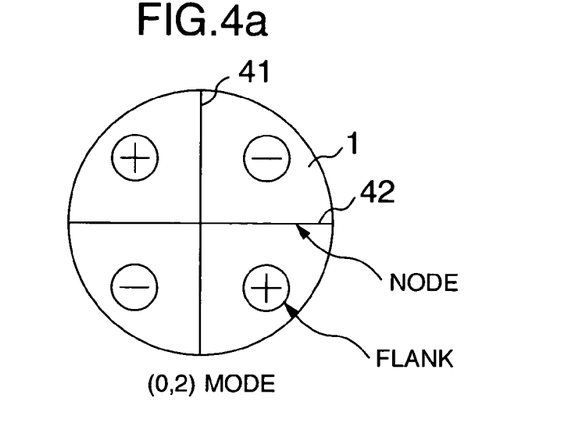
FIG. 4a is a view for explaining a vibration mode of a disc.
Figure 4B:
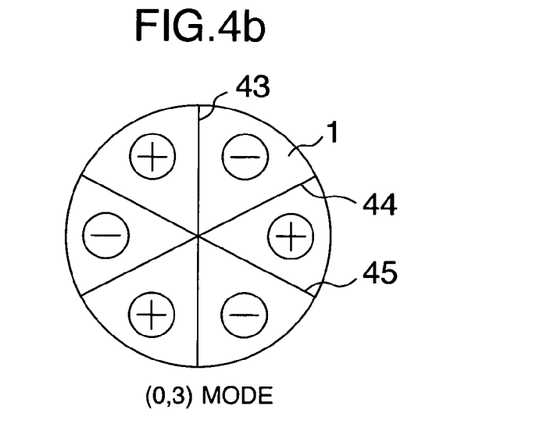
FIG. 4b is a view for explaining a vibration mode of a disc.
Figure 4C:
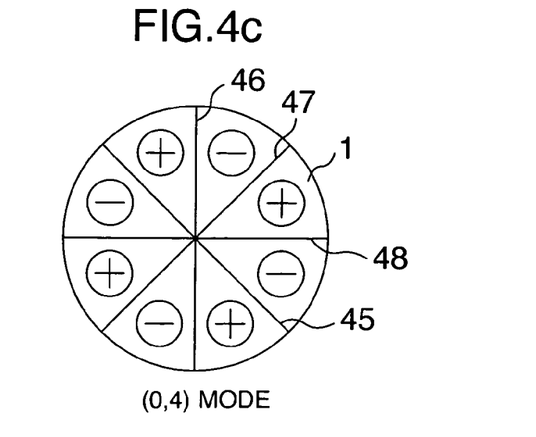
FIG. 4c is a view for explaining a vibration mode of a disc.

By the way, as shown in FIGS. 4*a* to 4*c*, when the disc drive unit 2 rotates the disc 1, various kinds of vibration and deformation modes are induced in the disc 1 due to the rotation thereof. FIG. 4*a* to 4*c* show secondary, tertiary and quartic vibration modes of diametric nodes of the disc 1. Parts indicated by (+) exhibit positive displacements in an off-surface direction, and parts indicated by (−) exhibit negative displacements in an off-surface direction. It is noted that the positive off-surface direction is upward from the sheet of the figures while the negative off-surface direction is downward from the sheet. Parts around the centers of the positive and negative signs are flanks of vibration modes, and straight lines 41 to 49 passing through the center of the disc 1 are nodes of the vibration modes. In the parts of the nodes 41 to 49, the disc is not displaced substantially in the off-surface direction.

A mode in which two nodes 41, 44 are exhibited, is called as a (0, 2) mode as shown in FIG. 4*a*, a mode in which three nodes 43 to 35 are exhibited is called as a (0, 3) mode, as shown in FIG. 4*b*, and a mode in which four nodes 46 to 49 are exhibited is called as a (0, 4) mode as shown in FIG. 4*c*. After the disc 1 is rotated, through observation of the rotation of the disc 1 from a static system, it is apparently seen that the disc is stationary in a certain deformation mode when the rotating speed of the disc 1 comes up to a predetermined speed. This rotating speed of the disc is called as the critical rotating speed.

When the speed comes up to the critical rotating speed, the disc 1 becomes unstable in general. In particular, when turbulence occurs at the periphery of the disc 1, the circumferential pressure distribution becomes ununiform, and as a result, deformation and vibration of the disc 1 are induced, resulting in detrimental serious affection such as several happenings of errors in writing in the disc drive unit 2.

A disc 1 made of polycarbonate resin, having a diameter of 120 mm and a thickness of 1.2 mm, which satisfies the International Standards for CDs and DVDs, has a critical speed which is about 6,600 r.p.m. in the (0, 2) mode, about 7,800 r.p.m. in the (0, 3) mode, or about 9,300 r.p.m. in the (0, 4) mode. Further, the specification of the disc drive units 2 involves the critical speed in the (0, 2) mode in the case of the specification as to writing to 8×-speed DVD-Rs, the critical speed in the (0, 3) mode in the case of the specification as to writing to 12×-speed DVD-Rs and the critical speed in the (0, 4) mode in the case of the specification as to writing to 16×-speed DVD-Rs.

In this embodiment, any one of CDs and DVDs can be used in this embodiment. Thus, the disc drive unit 2 in this embodiment, the position of nodes of the disc is adjusted in an example shown in FIG. 3*a*. At a certain critical speed, the flank of the deformation mode of the disc 1 in the disc drive unit 2 is located above the optical head 5. FIG. 3*b* is a sectional view along line C-C in FIG. 3*a*, and shows characteristics of inclination of the optical head 5 and the disc 1 in simulation.

In order to reduce errors in recording and reproduction, caused by inclination of the disc 1, the disc 1 is prevented from being inclined with respect to the optical head 5 to be used. That is, it is arranged so as to confront to the optical disc. Thus, in the deformation mode of the disc 1, upon finding of a position where the disc 1 confronts the optical head 5, the differential coefficient becomes zero in the flank part of the deformation mode where the inclination is zero. Thus, the position of the flank of the vibration mode of the disc 1 is arranged to confront the optical head. In this embodiment, as shown in FIG. 3, the flank of the vibration mode of the disc 1 is set at the position of the center of the optical disc 5 or in particular the objective lens 6.

The disc 1 used as a CD or a DVD, has a maximum amplitude of disc deformation in a vibration mode, which is about +/−100 μm. Thus, it is in an allowable range in the follow-up plane in which the optical head 5 follows the displacement of the disc 1. However, the displacement itself causes an error as stated above if the disc 1 is inclined even in the allowable range, thus, the positional control of the deformation of the disc 1 is important.

Thus, in comparison with a conventional disc unit, this fact becomes more clear. FIGS. 5*a* to 5*b* show the conventional disc drive unit 2*x*. FIG. 5*a* is a top view illustrating a conventional disc drive unit 2*x*, in which a top cover 8*x* is removed. It is noted, for reference that four concave and convex parts 9*x* formed in the top cover 8*x* are indicated with broken lines at corresponding positions. This concave and convex parts 9*x* are formed in order to suppress vibration of the disc 1, and to reinforce the stiffness of the top cover 8*x* itself. One of the concave and convex parts 9*x* formed in the top cover 8*x*, is located right above the optical head 5. Further, the other three concave and convex parts 9*x* are formed at equal circumferential intervals of 90 deg. It is noted that the concave and convex parts 9*x* are projected inward of the disc drive unit 2*x*.

In FIG. 5*a*, the deformation of the disc 1 is at a position of a node of the mode on the upper surface of the optical head 5. Although FIG. 5*a* shows the (0, 4) mode among deformation modes of the disc 1, in the disc drive unit 2*x*, the position of a node of a deformation mode of the disc 1 is located above the optical head 5 even in the (0, 2) mode or in the (0, 3) mode. In this case, in the optical head 5, as shown in a section along line B-B, as shown in FIG. 5*b*, the inclination θ between the optical head 5 and the disc 1 becomes maximum in the circumferential direction, causing errors recording and reproduction.

Referring to FIGS. 6*a* to 6*c*, the off-surface displacement and variation in inclination of the disc 1 at the critical speed are indicated with respect differences among the circumferential positions of the concave and convex parts 9, 9*x* as parameters. The vibration mode of the disc 1 is the (0, 4) deformation mode. The angle on the abscissa is an angle in the rotating direction of the disc 1 with a reference angle of 0 deg. at a position right above the optical head 5. FIG. 6*a* shows a result of measurements as to the conventional disc drive unit 2*x* shown in FIG. 5*a*. A plane 16*a* right above the optical head 5 corresponds to a node of the deformation of the disc 1. As a result, the inclination between the optical head 5 and the disc 1 becomes maximum.

FIGS. 6*b* and 6*c* shows results of measurements as to the disc drive unit 2 in this embodiment. In FIG. 6*b*, the four concave and convex parts 9 are all shifted from the positions of the concave and convex parts 9*x* in the circumferential direction by an angle of 45 deg. The disc 1 is slightly deviated from the node of the deformation of the disc 1 at a position 16*b* right above the optical head 5. Further, since the position 16*b* right above the optical head 5 is deviated from the node of the mode, the inclination between the optical head 5 and the disc 1 is slightly smaller.

In FIG. 6c, the circumferential positions of the concave and convex parts 9 are further changed. Specifically, the concave and convex parts 9 are formed at circumferential positions having angles of 60 and 120 deg. as measured circumferentially lockwise and counterclockwise respectively from the straight line 11, as a reference, connecting between the center o of rotation of the disc 1 and the center of the objective lens 6. The position 16c right above the optical head is the position of the flank of the deformation of the disc 1, and the inclination between the optical head 5 and the disc 1 is extremely small in comparison with that in the above-mentioned embodiments. The amplitude of the deformation mode of the disc 1 is extremely small such as about 10 μm. Thus, with the arrangement of the concave and convex parts at suitable circumferential positions in the top cover 8, the position of the mode of the disc 1 which is induced upon rotation at the critical speed can be shifted from the position of a node, right above the optical head 5.

This is the result of restraint to the air stream between the upper surface of the disc 1 and the top cover 8, With the concave and convex parts 9 explained in the above-mentioned embodiment, the gap between the upper surface of the disc 1 and the top cover 8 is locally narrowed. Thus, the flowing speed in the narrow part becomes larger than that in parts therearound. That is, the pressure in the direction of rotation of the disc 1 is higher than that in the longitudinal direction in the narrow part. It is considered that the force of constraint in the off-surface direction becomes stronger in this narrow part, and accordingly, vibration and deformation of the disc 1 become remarkable in front and rear thereof even with a small external force. By controlling the circumferential positions of the concave and convex parts 9 as stated above, the position of the flank or node of the vibration mode of the disc at the critical speed can be controlled.

In view of the above-mentioned consideration, without arranging the concave and convex parts above the optical head 5, the concave and convex parts are set in a range from 45 to 80 deg. circumferentially clockwise and in a range from 100 to 135 deg. circumferentially counterclockwise, measured from the straight line 11, as a reference, connecting between the center o of rotation of the spindle motor 7 and the center of the objective lens 6. Similarly, they are set in a range from 45 to 80 deg. and in a range from 100 to 135 deg., counterclockwise measured from the reference line 11. Further, it is indispensable to prevent them from being arranged on the reference line 11 and lines orthogonal to the reference line 11.

Figure 7A:
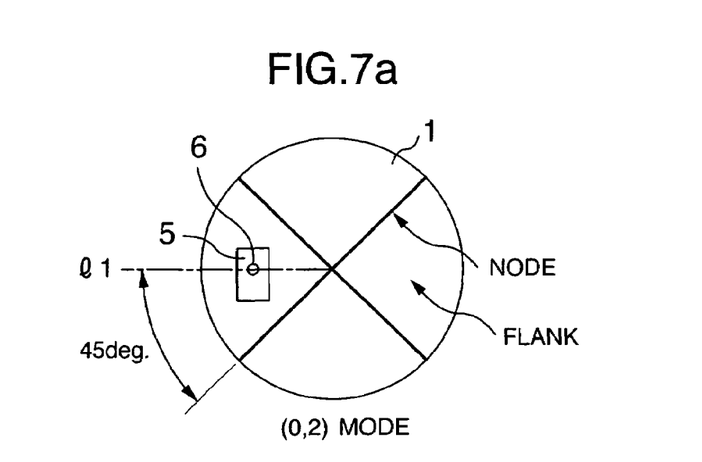
FIG. 7a is a view for explaining positions of nodes upon deformation of a disc.
Figure 7B:
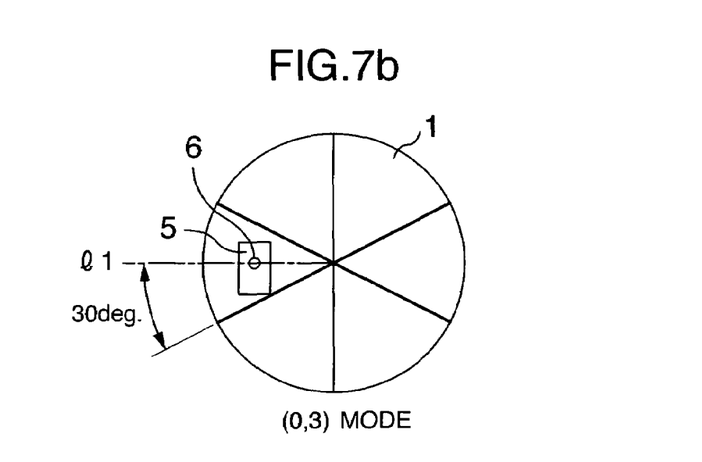
FIG. 7b is a view for explaining positions of nodes upon deformation of a disc.
Figure 7C:
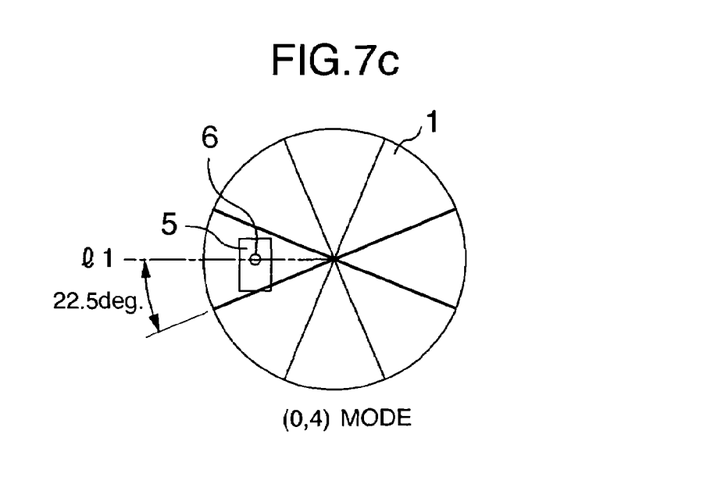
FIG. 7c is a view for explaining positions of nodes upon deformation of a disc.

In the above-mentioned embodiments, although explanation has been made of the embodiments in which the four concave and convex parts are formed in the top cover, at least one concave and convex part can prevent occurrence of error in recording or reproduction caused by an inclination of the disc. In this configuration, it goes without saying to set the circumferential position of the concave and convex part in the above-mentioned ranges. Explanation will be hereinbelow made of another embodiment which can prevent occurrence of errors in recording or reproduction caused by an inclination of a disc with reference to FIGS. 7a to 9b. FIGS. 7a to 7c show deformation modes of the disc 1 which are desirable in the disc drive unit 2. That is, the relationships between the optical head 5 and the circumferential positions of nodes and flanks of the disc 1 at the critical speed are shown. If the flanks of the (0, 2) mode, the (0, 3) mode and the (0, 4) mode of the disc 1 are positioned right above the optical head 5, the inclination between the optical head 5 and the disc 1 can be less. If the positions of the flanks of these modes are set as shown, errors in recording or reproduction of data can be reduced.

Figure 8A:
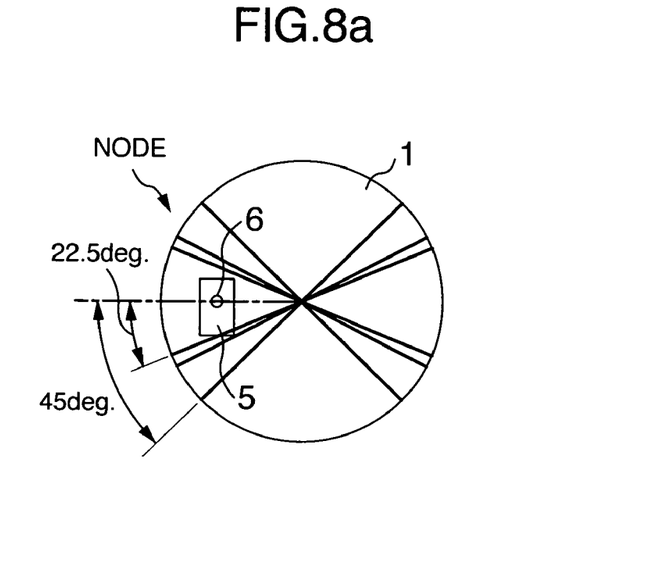
FIG. 8a is a view for explaining a deformation in an embodiment of the disc drive unit according to the present invention.
Figure 8B:
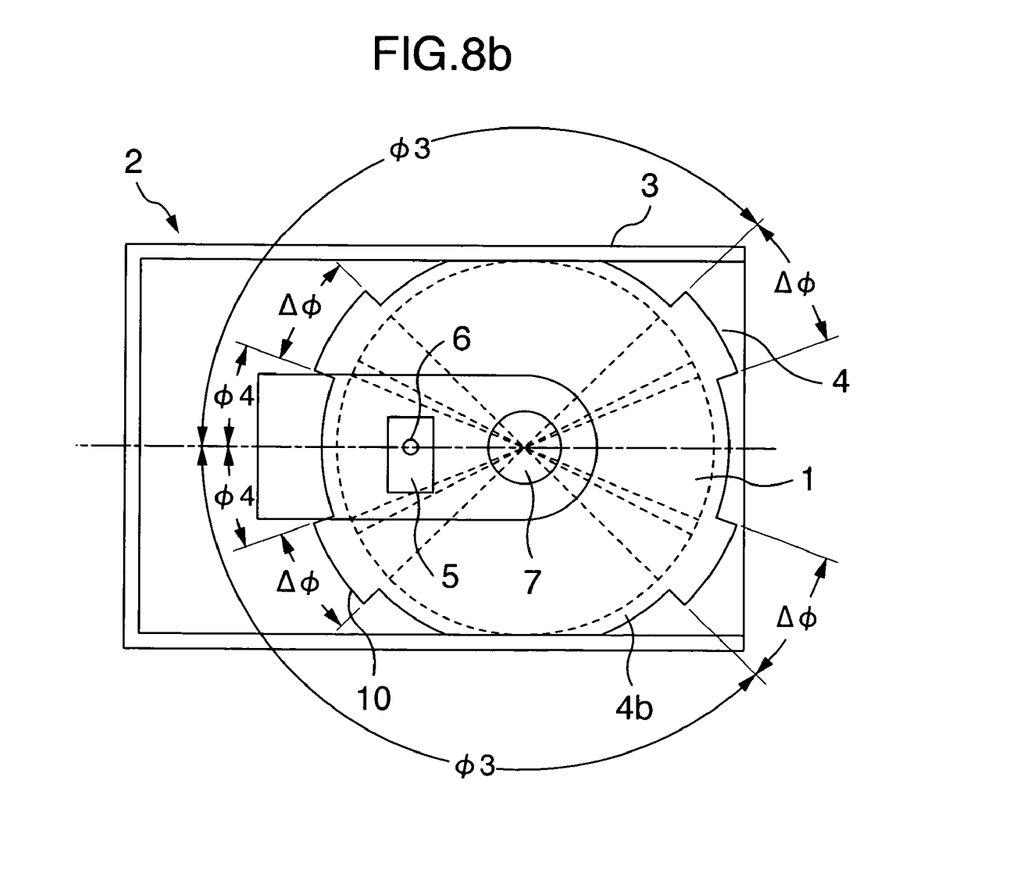
FIG. 8b is a view for explaining a deformation in an embodiment of the disc drive unit according to the present invention.

In the (0, 2) mode, the (0, 3) mode and the (0, 4) mode, if the flanks of these modes are positioned right above the optical head 5, the nodes of the modes are located at positions of 45 deg., 30 deg. and 22.5 deg., clockwise and counterclockwise measured from the straight line 11 connecting between the center of rotation of the spindle motor 7 and the center of the objective lens 6. In order to enable the optical head 5 to stably record and reproduce data even in such a case that the disc is rotated with these three critical speeds, the nodes of these modes are set in a range from 22.5 to 45 deg., and 135 to 157 deg., clockwise and counterclockwise measured from the straight line 11 as a reference, as shown in FIG. 8a in which the vibration modes are superposed with one another. FIG. 8b shows the configuration of the disc tray 4 with which the nodes of the vibration modes are in the modes shown in FIG. 8a.

In this embodiment, disc deformation mode control parts 10 are formed at four positions around the circular recess 4b shown in FIG. 1, having a diameter which is slightly larger than the diameter of the disc 1. The disc deformation mode control parts 10 are set in a range which includes all nodes of the three vibration modes. That is, theoretically, $\Delta\phi 4 = 22.5$ deg., and angles $\phi 3$, $\phi 4$ at which the disc deformation mode control parts 10 are started, are set as $\phi 4 = 22.5$ deg., and $\phi 3 = 135$ deg. Practically, with a slight margin, there may be set $\Delta\phi = 22.5$ deg.$+\alpha$, $\phi 3 = 135$ deg.$-\beta$, $\phi 4 = 22.5$ deg.$-\beta$, $\alpha = 0$ to 5 deg., $\beta = 0$ to 5 deg.

Since the second recesses 10 are formed, the stream between the side surface of the disc 1 and the disc tray 4 is controlled. In general, the disc is rotated, being slightly eccentric. Thus, gap variation is always caused due to the eccentricity in the gap defined between the side surface of the disc 1 and the disc tray, and accordingly, disturbance of air stream is caused in the gap. Since the second recesses 10 are formed so as to locally increase the gap, the rate of gap variation caused by eccentricity of the disc 1 can be reduced.

That is, between the side surface of the disc 1 and the disc tray 4, it is considered that disturbance of air stream is less in a part having a large gap but disturbance of air stream is larger in a part having a small dap. As a result, in a part which is the second recess where the disturbance is less, the affection of an external force becomes small with respect to vibration and deformation of the disc 1. On the contrary, in a part where no second recess 10 is formed, the affection of an external force becomes larger with respect to vibration and deformation of the disc 1. Thus, by controlling the gap between the side surface of the disc 1 and the disc tray 4, the positions of the flank and node of the vibration mode at the critical speed can be controlled.

It is noted here, the applicants have confirmed such a fact that the mode positions can be changed by at least one or more of the disc deformation mode control parts although the disc deformation mode control parts 10 are formed at four positions in the circumferential direction in this embodiment.

Figure 9A:
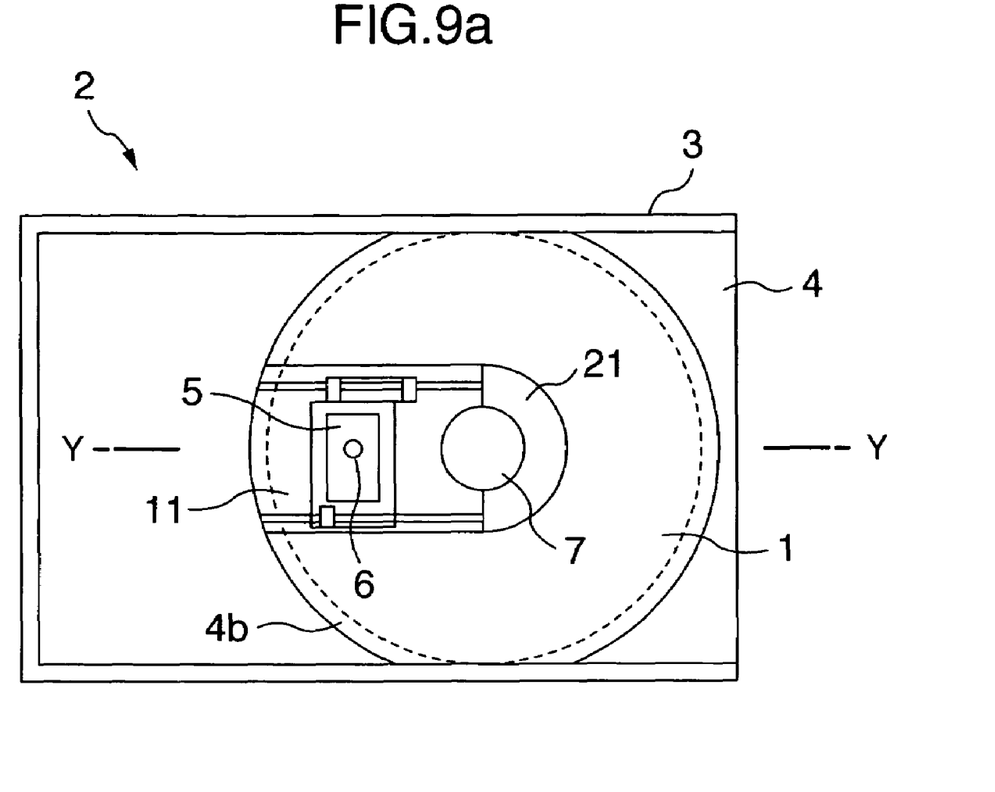
FIG. 9a is a top view illustrating another embodiment of the disc drive unit according to the present invention.
Figure 9B:
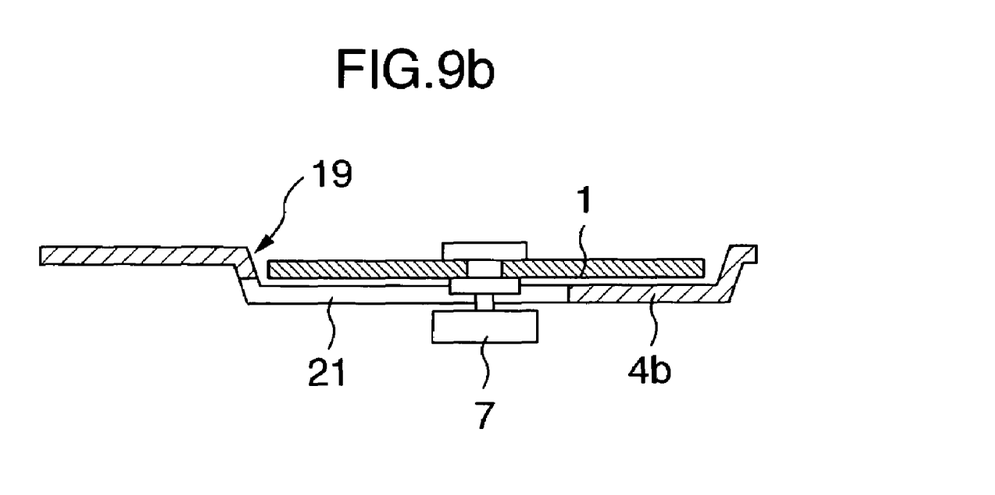

FIGS. 9a to 9b show another embodiment of the disc tray 4. FIG. 9a is a top view illustrating the disc tray, and FIG. 9b is a sectional view along line Y-Y in FIG. 9a. A cutout 21 which allows the optical head 4 to travel, is formed in the bottom surface of the recess 4b of the disc tray 4, within a traveling range of the optical head 4. The inward position of the cutout 21 is set up to the outer peripheral part of the recess 4b, and a wall surface is formed in a rise-up part 19 confronting the side surface of the disc 1, similar to the periphery thereof, as shown in FIG. 9b. With this configuration, the pressure distribution in the circumferential direction of the disc 1 becomes uniform. With the combination of the concave and convex parts 9 and the disc deformation mode control parts 10 formed in the disc tray 4, the position of the disc deformation mode can be appropriated on the upper surface of the optical head.

The invention claimed is:

1. A disc drive unit comprising:

a spindle motor having a rotary shaft for rotating an optical disc;

a top cover located above the optical disc;

an optical head for reproducing data recorded on the optical disc or recording data thereon;

a disc clamper incorporated to the top cover, for holding the optical disc in cooperation with the rotary shaft of the spindle motor; and at least one concave part and one convex part formed in an inner surface of the top cover that faces inward of the disc drive unit, wherein the at least one concave part and one convex part are located at positions substantially symmetric to each other with respect to the rotary shaft of the spindle motor, the at least one concave part and one convex part each being slanted with respect to a line connecting the center of the rotary shaft and the center of an objective lens incorporated in the optical head at an angle substantially in the range between 45° to 80° and 100° to 135°, the at least one concave part and one convex part being not present on the line connecting between the center of the rotary shaft of the spindle motor and the center of the objective lens, and wherein the disc drive unit is characterized in that the concave and convex parts formed in the inner surface of the top cover have an oval shape having a height from 2 to 4 mm, a width from 10 to 15 mm and a length from 20 to 30 mm which extends radially of the disc.

* * * * *